(12) United States Patent
Karuppannan et al.

(10) Patent No.: US 11,452,252 B2
(45) Date of Patent: Sep. 27, 2022

(54) TORQUE DAMPER FOR AGRICULTURAL HARVESTER HEADER

(71) Applicant: CNH Industrial America LLC, New Holland, PA (US)

(72) Inventors: Thamilselvan Karuppannan, Bettendorf, IA (US); Nicholas J. Laufenberg, Glen Ellyn, IL (US)

(73) Assignee: CNH Industrial America LLC, New Holland, PA (US)

( * ) Notice: Subject to any disclaimer, the term of this patent is extended or adjusted under 35 U.S.C. 154(b) by 311 days.

(21) Appl. No.: 16/744,969

(22) Filed: Jan. 16, 2020

(65) Prior Publication Data

US 2021/0219483 A1 Jul. 22, 2021

(51) Int. Cl.
| | |
|---|---|
| *A01B 71/06* | (2006.01) |
| *A01D 45/02* | (2006.01) |
| *A01D 69/00* | (2006.01) |
| *F16D 47/02* | (2006.01) |
| *F16F 15/12* | (2006.01) |
| *F16D 7/08* | (2006.01) |
| *F16D 3/68* | (2006.01) |
| *F16D 3/04* | (2006.01) |

(52) U.S. Cl.
CPC ............ *A01B 71/06* (2013.01); *A01D 45/021* (2013.01); *A01D 69/002* (2013.01); *F16D 47/02* (2013.01); *F16D 3/04* (2013.01); *F16D 3/68* (2013.01); *F16D 7/08* (2013.01); *F16F 15/12* (2013.01)

(58) Field of Classification Search
CPC . A01B 71/06; F16D 47/02; F16D 3/04; F16D 3/68; F16D 7/08; A01D 69/002; A01D 45/021; A01D 41/142; A01D 69/08; A01D 69/06; F16F 15/12; F16F 2238/02; F16F 15/123
See application file for complete search history.

(56) References Cited

U.S. PATENT DOCUMENTS

| | | | | |
|---|---|---|---|---|
| 3,831,356 | A * | 8/1974 | Maiste | A01D 45/021 56/10.3 |
| 7,937,918 | B1 | 5/2011 | Mossman | |
| 8,010,262 | B2 * | 8/2011 | Schroeder | A01D 41/1243 701/50 |
| 2005/0279070 | A1 * | 12/2005 | Pirro | A01D 69/005 56/14.6 |

(Continued)

FOREIGN PATENT DOCUMENTS

| | | | | |
|---|---|---|---|---|
| CN | 104653738 A * | 5/2015 | | F16H 35/00 |
| CN | 106641095 A * | 5/2017 | | F16F 15/12 |

(Continued)

OTHER PUBLICATIONS

Extended European Search Report for EP Application No. 21151894.9 dated Jun. 15, 2021 (five pages).

*Primary Examiner* — Arpad Fabian-Kovacs
(74) *Attorney, Agent, or Firm* — Peter Zacharias; Patrick Sheldrake (57) ABSTRACT

A drive system of a header for an agricultural vehicle. The header includes a plurality of driven devices. The drive system includes a shaft configured for conveying motive power from the agricultural vehicle to the header, a gearbox configured for being located on the header and for transferring motive power to the plurality of driven devices, and a torque damper. The torque damper is operably connected in between the shaft and the gearbox. The torque damper is configured for reducing a magnitude of a torque spike.

17 Claims, 6 Drawing Sheets

(56) References Cited

U.S. PATENT DOCUMENTS

| | | | | |
|---|---|---|---|---|
| 2005/0279073 | A1* | 12/2005 | Clauss | A01D 41/142 56/364 |
| 2006/0223640 | A1* | 10/2006 | Bassett | F16D 3/02 464/30 |
| 2010/0095645 | A1* | 4/2010 | Tippery | A01D 41/142 56/13.6 |
| 2015/0373910 | A1* | 12/2015 | Surmann | A01D 41/142 56/14.5 |
| 2018/0199508 | A1 | 7/2018 | Mueller et al. | |
| 2019/0183056 | A1* | 6/2019 | Vergara | A01D 34/828 |

FOREIGN PATENT DOCUMENTS

| | | | | |
|---|---|---|---|---|
| CN | 103987248 B | | 6/2017 | |
| CN | 107873244 A | * | 4/2018 | A01D 69/025 |
| DE | 19815571 A1 | * | 10/1999 | A01D 45/021 |
| DE | 19919449 A1 | * | 11/1999 | F16F 15/123 |
| DE | 20108221 U1 | * | 8/2001 | A01D 78/1057 |
| DE | 202005003236 U1 | * | 6/2005 | A01D 45/021 |
| DE | 102011118207 A1 | * | 5/2013 | B60B 27/0015 |
| DE | 102016109507 A1 | * | 11/2017 | A01D 69/08 |
| DE | 102018131344 A1 | * | 6/2020 | F16F 15/1297 |
| EP | 0074097 A1 | * | 3/1983 | A01F 12/56 |
| EP | 0464997 A1 | * | 1/1992 | F16F 15/12 |
| EP | 2151156 A2 | * | 2/2010 | A01D 75/182 |
| EP | 2179638 A1 | | 4/2010 | |
| EP | 3479674 A1 | * | 5/2019 | A01D 89/005 |
| EP | 3556197 A1 | | 10/2019 | |
| FR | 1563968 A | | 3/1968 | |
| GB | 2486730 A | * | 6/2012 | A01B 71/06 |
| JP | H10509497 A | * | 9/1998 | F16F 15/123 |
| JP | 2004261093 A | | 9/2004 | |

* cited by examiner

TORQUE DAMPER FOR AGRICULTURAL HARVESTER HEADER

BACKGROUND OF THE INVENTION

The present invention pertains to agricultural harvester headers and, more specifically, to drivelines of agricultural harvester headers.

An agricultural harvester known as a "combine" is historically termed such because it combines multiple harvesting functions with a single harvesting unit, such as picking, threshing, separating, and cleaning. A combine includes a header, which removes the crop from a field, and a feeder housing which transports the crop matter to a threshing and cleaning system. The threshing and cleaning system may include a threshing rotor that rotates within a housing and performs a threshing operation on the crop material to remove the grain. The housing may include adjustable concaves with perforations for the grain to pass therethrough. Once the grain is threshed, it falls through the perforations in the concaves onto a grain pan. From the grain pan, the grain is cleaned using the cleaning system, which generally includes one or more sieves and a cleaning fan. The cleaning fan blows air through the sieves to discharge chaff and other debris toward the rear of the combine. The clean grain is then transported to a grain tank onboard the combine via a clean grain auger. Material other than grain (MOG), such as straw, debris, dust, etc., from the threshing section proceeds through a residue system, which may utilize a straw chopper to process the MOG and direct it out through the rear of the combine. Typically, a combine is equipped with side doors that allow an operator to easily access the threshing and cleaning system.

A corn header generally includes a conveyor, row units, and accompanying drive architecture to power the header. The conveyor is disposed aft of the row units and it may be in the form of a conveyor belt, an auger with a tubular shaft having left and right flighting, or a combination of both. The row units generally include snouts, gathering chains, and stalk rolls. The corn header may also include chopping units, also known as "choppers", located underneath the stalk rolls. The snouts are conically shaped to pass in between the rows of corn, defining a designated passageway in between the snouts for the rows of corn to travel therein. Hence, a respective row unit may have a slot to receive a respective row of corn. Each row unit also includes respective gearboxes to drive the gathering chains and stalk rolls. A gathering chain generally includes chain links that form an endless chain and protuberances, such as paddles, affixed thereto for contacting the corn stalks. As the combine traverses the field, the corn stalks are pulled inwardly by the gathering chains and downwardly by the stalk rolls. This motion causes the ears of corn to contact the base of the header, e.g. deck plate, and snap off from their respective stalks. The gathering chains additionally help to move crop material inwardly towards the conveyor, which transports the ears of corn to the center of the header for entry into the feeder housing. The stripped corn stalks are further pinched and crushed by the stalk rolls, in order to accelerate the decomposition process of the stalks. The chopping units include rotating blades, located beneath the stalk rolls, which chop the stalks, leaves, or other MOG into smaller pieces for expediting the decomposition thereof.

Some corn headers may include a split drive system with separate drivelines and gearboxes for individually and respectively driving the row units and chopping units. For instance, each row unit may include a gearbox for driving the gathering chains and stalk rolls. Each row-unit gearbox may be operably connected to and driven by a single row-unit driveline, which in turn is operably driven by the power take off (PTO) of the combine. Hence, independently from the row units, the chopping units may be driven by a separate set of chopper gearboxes coupled to a separate chopper driveline which is driven by the PTO.

During engagement or in-field operation of the header, the chopping units may cause a spike in torque within the chopper driveline which may damage the driveline of the combine. For example, the spikes in torque may bend, break, or otherwise damage the intermediary drive shaft and/or the jack shaft of the feeder housing. As can be appreciated, the idle speed of the engine and/or the control system of the combine may affect the severity of the torque spikes during the startup operation of the header. Hence, such torque spikes may limit header-combine compatibility since some headers may inevitably damage an incompatible combine.

What is needed in the art is a drive system for a header that efficiently reduces torque spikes in the header in order to increase the compatibility of the header.

SUMMARY OF THE INVENTION

In one exemplary embodiment formed in accordance with the present invention, there is provided a drive system of a header that includes a gearbox and a torque damper. The torque damper operably connects the gearbox to the drive shaft which transmits motive power from the combine to the header. The torque damper reduces a magnitude of a torque spike, caused by the driven components of the header, to protect the driveline components of the header and/or combine during an initial startup and/or harvesting operation of the header.

In another exemplary embodiment formed in accordance with the present invention, there is provided a drive system of a header for an agricultural vehicle. The header includes a plurality of driven devices. The drive system includes a shaft configured for conveying motive power from the agricultural vehicle to the header, a gearbox configured for being located on the header and for transferring motive power to the plurality of driven devices, and a torque damper. The torque damper is operably connected in between the shaft and the gearbox. The torque damper is configured for reducing a magnitude of a torque spike.

In yet another exemplary embodiment formed in accordance with the present invention, there is provided an agricultural vehicle that includes a chassis, a prime mover supported by the chassis and configured for providing motive power, a header connected to the chassis and including a plurality of driven devices, and a drive system for driving the plurality of driven devices. The drive system includes a shaft connected in between the header and the chassis and configured for conveying motive power from the prime mover to the header, a gearbox located on the header and configured for transferring motive power to the plurality of driven devices, and a torque damper. The torque damper is operably connected in between the shaft and the gearbox. The torque damper is configured for reducing a magnitude of a torque spike.

In yet another exemplary embodiment formed in accordance with the present invention, there is provided a method for operating a header for an agricultural vehicle. The header includes a plurality of driven devices. The method includes the initial step of providing a drive system for driving the plurality of driven devices. The drive system includes a shaft configured for conveying motive power from the agricultural vehicle to the header, a gearbox configured for being located on the header and for transferring motive power to the plurality of driven devices, and a torque damper. The torque damper is operably connected in between the shaft and the gearbox. The method also includes connecting the header to the agricultural vehicle, initializing a startup operation of the header and starting the header, and dampening a magnitude of a torque spike, by the torque damper, in the startup operation.

One possible advantage of the exemplary embodiment of the drive system is that the torque damper diminishes a magnitude of the spikes in torque caused by the driven elements of the header and transmuted back through the driveline of the header and/or combine.

Another possible advantage of the exemplary embodiment of the drive system is that torque damper allows the header to be compatible with various differing combines.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural harvester and/or components thereof are usually determined with reference to the direction of forward operative travel of the harvester, but they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward." The term startup operation of the header may refer to a process and time during which motive power is initially provided to one or more driven devices of the header and the driven devices in order to startup the driven devices. The term harvesting operation of the header may refer to a process wherein the header is cutting and/or gathering the crop material from the field.

Figure 1:
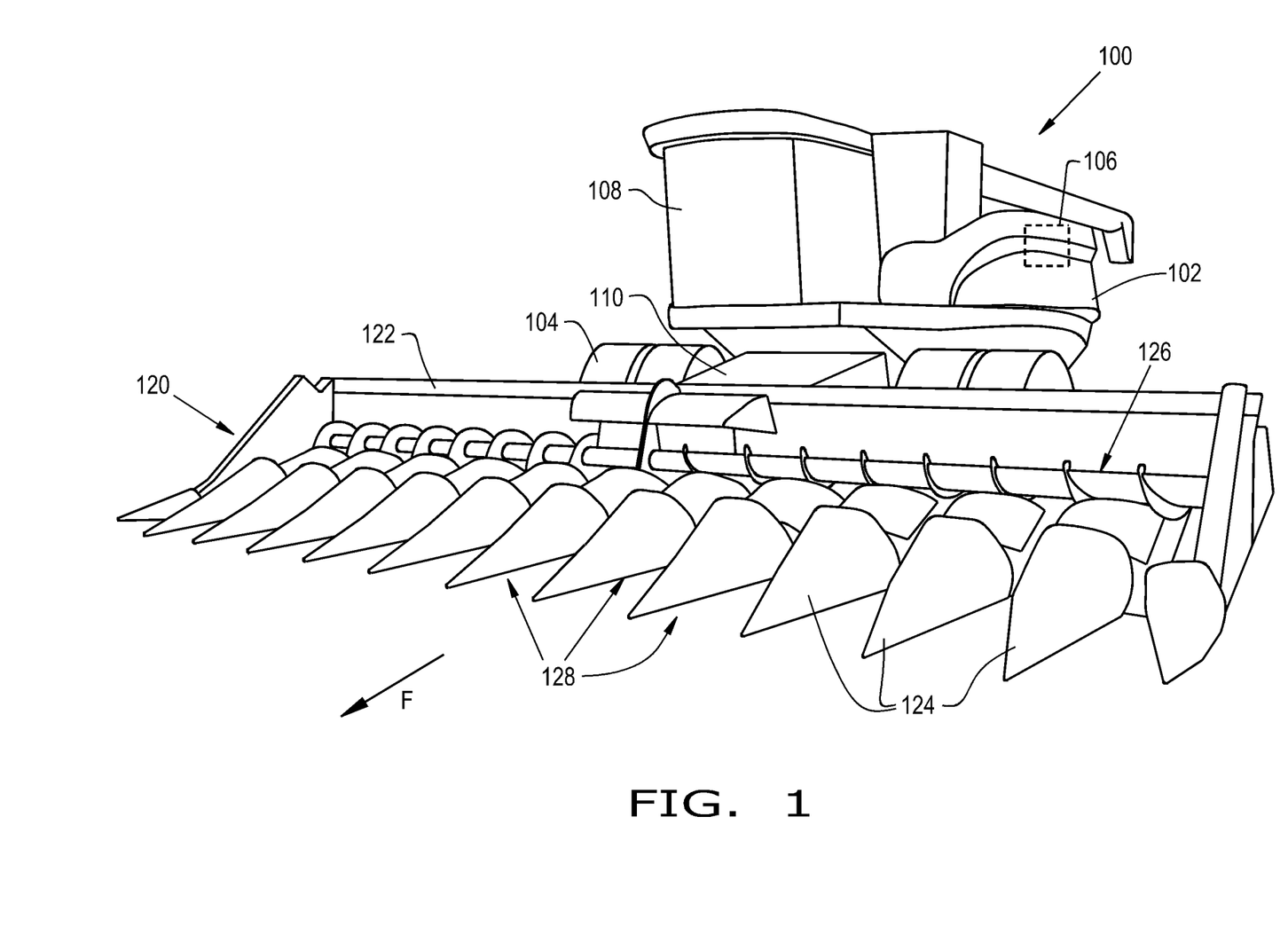
FIG. 1 illustrates a perspective view of an exemplary embodiment of an agricultural vehicle including a corn header which has multiple row units, in accordance with an exemplary embodiment of the present invention.
Figure 2:
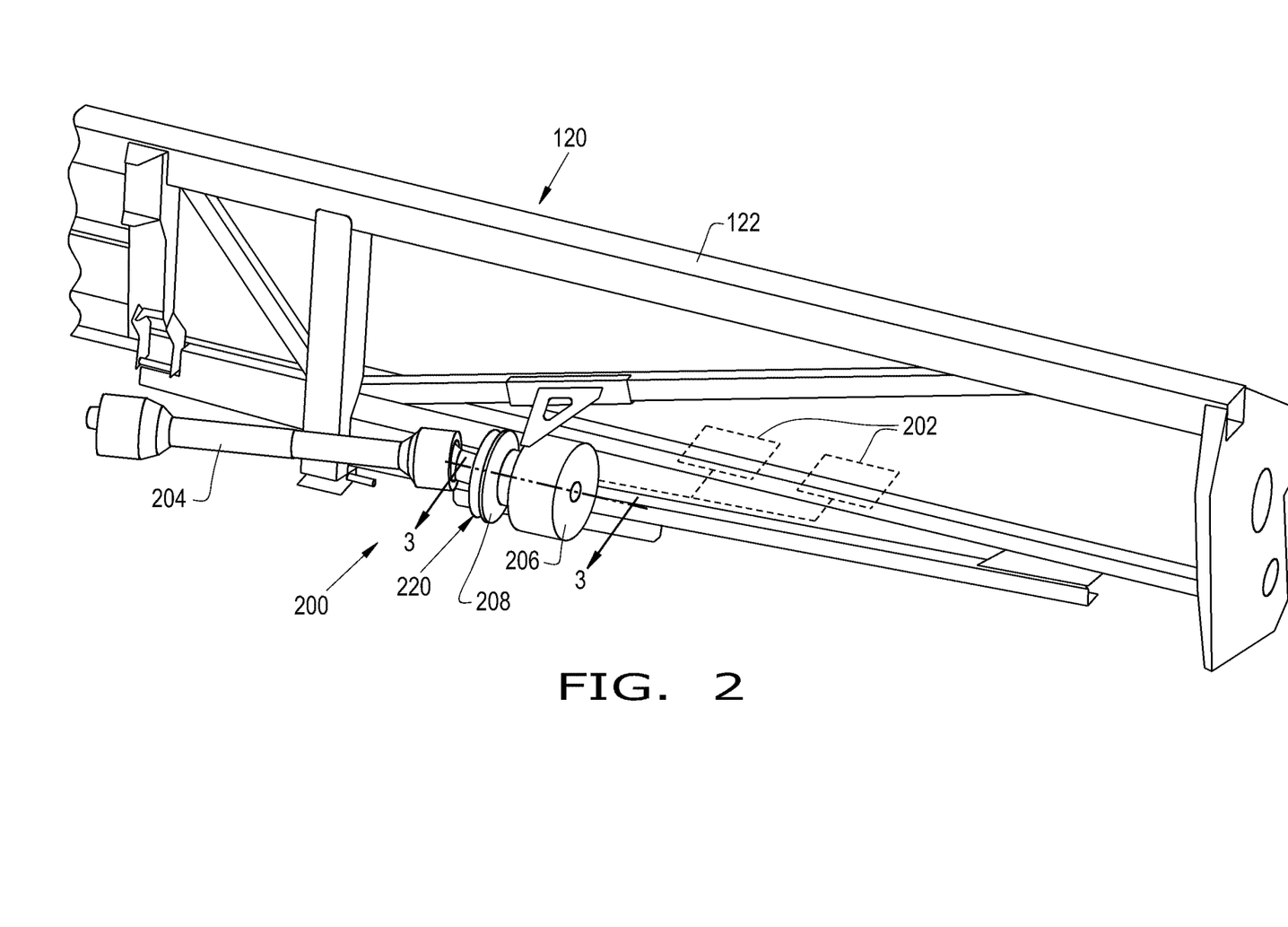
FIG. 2 illustrates a rear perspective view of the corn header of FIG. 1, the corn header includes a drive system with a torque damper that is operably coupled in between drive shaft and the choppers.

Referring now to the drawings, and more particularly to FIGS. 1-2, there is shown an exemplary embodiment of an agricultural vehicle 100. The agricultural vehicle 100 may generally include a chassis 102, wheels 104 driven by a prime mover 106, an operator cab 108, a feeder housing 110 pivotally connected to the chassis 102, and a header 120. The agricultural vehicle 100 may be in the form of any desired agricultural vehicle, such as a combine 100.

The header 120 may be connected to the feeder housing 110. The header 120 removes and gathers the crop material from the field as the agricultural vehicle 100 traverses across the field in a forward direction of travel "F". The header 120 may be in the form of any desired header, such as a corn header 120. The corn header 120 may include a header frame 122, multiple snouts 124 which define channels therebetween for receiving the rows of corn, a crop conveyor 126, such as an auger 126, to convey the crop material inwardly toward the feeder housing 110, and multiple row units 128 connected to and supported by the frame 122.

Each row unit 128 generally includes gathering chains and stalk rolls (not shown). The row units 128 may be driven by gearboxes coupled to one or more cross shaft(s), which are operably coupled to the agricultural vehicle 100. The gathering chains and the stalk rolls may be respectively in the form of any desired gathering chains and stalk rolls.

Figure 3:
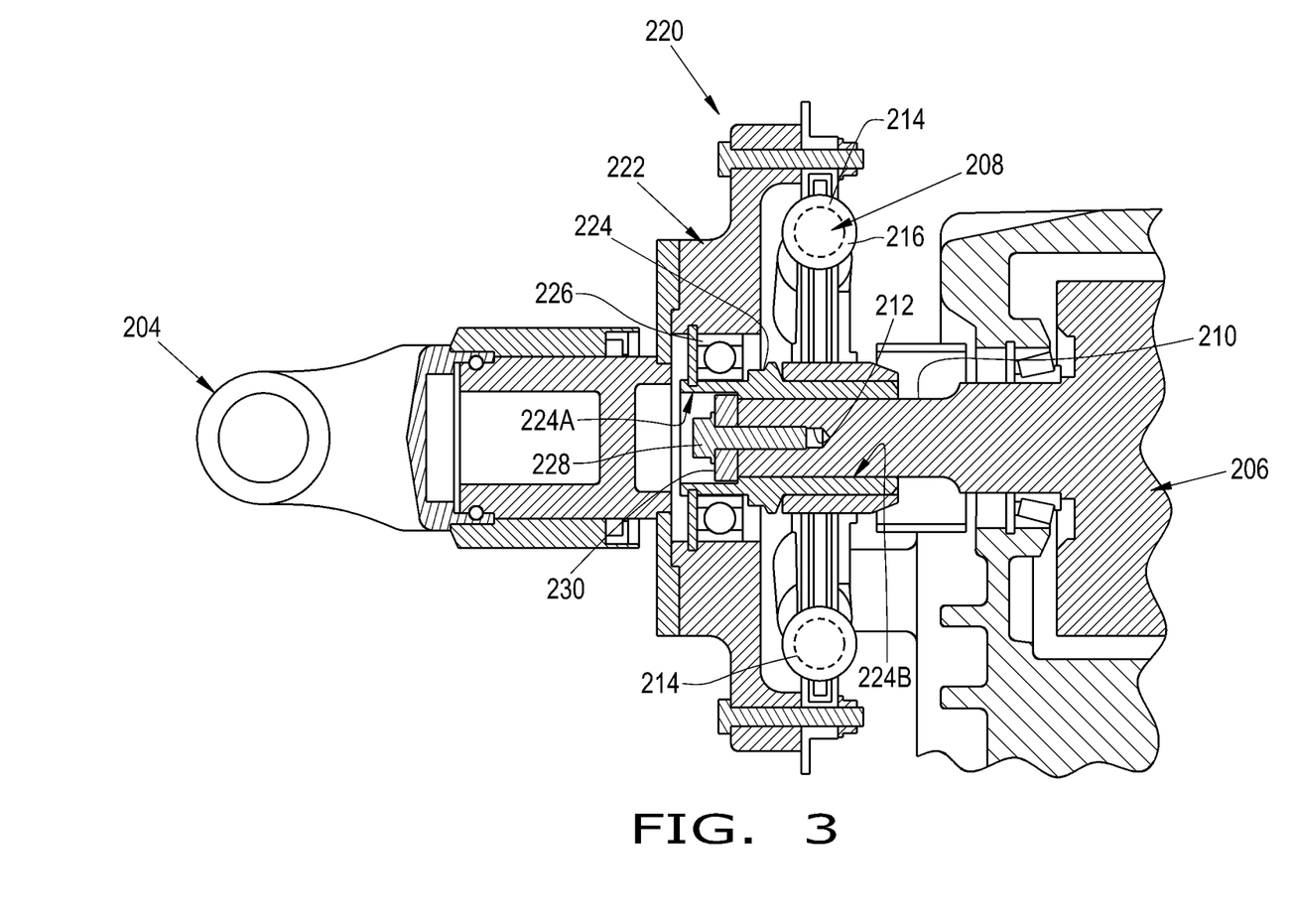
FIG. 3 illustrates a cross-sectional view of the torque damper, taken across line 3-3 in FIG. 2.

Referring now collectively to FIGS. 1-3, there is shown an exemplary embodiment of a drive system 200 of the header 120 for driving multiple driven devices, e.g. row units and/or choppers 202. The drive system 200 is a split drive system with a row-unit drive portion and a chopper-unit drive portion which transmits motive power to the choppers 202. In the chopper-unit drive portion, the drive system 200 generally includes a drive shaft 204, a gearbox 206, and a torque damper 208 operably connected in between the shaft 204 and the gearbox 206 for reducing a magnitude of a torque spike during a startup operation of the header 120 and/or a harvesting operation of the header 120. The drive system 200 may also include a coupling assembly 220 which operably connects the torque damper 208 to the shaft 204 and the gearbox 206. As shown, the drive system 200 is integrated into a corn header for driving choppers 202; however, it should be appreciated that the drive system 200 may be integrated into any desired header, for example a draper head or pickup head. Furthermore, it should be appreciated that the components of the drive system 200 may be incorporated as part of the header 120 and/or the agricultural vehicle 100.

The choppers 202, which are schematically illustrated in FIG. 2, may include reciprocating knives that are located underneath the stalk rolls for chopping the remaining crop material into smaller pieces. The choppers 202 may be separately driven from the gathering chains and stalk rolls. Hence, the choppers 202 may be driven by designated gearboxes and cross shaft(s) which are operably coupled to and independently driven by the agricultural vehicle 100. The choppers 202 may be in the form of any desired choppers.

The shaft 204 may be a power take off (PTO) shaft 204 of the agricultural vehicle 100 which extends outwardly from the feeder housing 110. More particularly, the shaft 204 may be operably connected in between the feeder drive jack shaft of the feeder housing 110 and the torque damper 208 via the coupling assembly 220. In operation, the drive system 200 may experience torque spikes which may damage the shaft 204 and/or the feeder drive jack shaft. For example, the feeder drive jack shaft may become bent and/or broken if a torque spike from the header 120 exceeds its operational stress limits. The drive shaft 204 can be in the form of any desired shaft for transmitting motive power from the agricultural vehicle 100 to the driven devices, e.g. choppers 202, of the header 120.

The gearbox 206 is connected to and supported by the header 120. The gearbox 206 transfers motive power from the shaft 204 to the driven devices, e.g. choppers 202, of the header 120. The gearbox 206 may be in the form of a back-sheet gearbox 206 which is affixed to the backside of the frame 122 of the header 120. The gearbox 206 may include a gearbox shaft 210, e.g. splined input shaft 210, with a receiving hole 212 therein (FIG. 3). The gearbox 206 may be in the form of any desired gearbox.

The torque damper 208 is operably connected in between the shaft 204 and the gearbox 206. The torque damper 208 may include multiple torsional springs 214 disposed within a housing 216. The torque damper 208 may reduce torsional spikes at start up, shut down, idle, and/or during a harvesting operation. The torque damper 208 may be in the form of any desired torque damper. For example, the torque damper may comprise a spring type torque damper 208, a fluid coupling type damper, and/or a flexible coupling type damper.

The coupling assembly 220 includes an adapter 222 operably connecting the torque damper 208 to the yoke of the shaft 204, a sleeve 224 connected to the shaft 210 of the gearbox 206, and a bearing 226 mounted on the sleeve 224. The adapter 222 may be in the form of a uniform plate with a left end connected to the yoke of the shaft 204, via fasteners, and a right end connected to the torque damper 208, via fasteners. It is conceivable that coupling assembly 220 may not include an adaptor 222 such that the drive shaft 204 directly connects to the torque damper 220.

The sleeve 224 is rigidly mounted onto the gearbox shaft 210 by splines and/or one or more fasteners. For example, the sleeve 224 can be connected to the gearbox shaft 210 by splines (unnumbered), a fastener 228, and an end washer 230 (FIG. 3). The fastener 228 is disposed within and threadedly engaged with the hole 212. The washer 230 is engaged with the fastener 228 and a corresponding inner lip of the sleeve 224 such that the fastener 228 and the washer 230 rigidly connect the sleeve 224 to the gearbox shaft 210. The sleeve 224 comprises a first, left end mounting the bearing 226 and a second, right end mounting the torque damper 208 such that the adapter 222 and the torque damper 208 are both supported by the sleeve 224. The sleeve 224 comprises an outer splined surface (unnumbered) engaging with the bearing 226 and the torque damper 208, a first bore 224A with a first diameter, and a second bore 224B with a second diameter which is different than the first diameter. The first bore 224A houses and engages with the washer 230, and the second bore 224B receives and engages with the gearbox shaft 210.

Referring now collectively to FIGS. 1 and 4-6, there is shown another exemplary embodiment of a drive system 400 of the header 120 for driving multiple driven devices, e.g. row units and/or choppers 202. The drive system 400 may be substantially similar to the drive system 200, except that the drive system 400 additionally includes an overrunning clutch 440 with a splined input coupler 442 and an output yoke 444. The drive system 400 may generally include a drive shaft 404, a gearbox 406, a torque damper 408 operably connected in between the shaft 404 and the gearbox 406, and a coupling assembly 420 with an adapter 422 that operably connects the torque damper 408 to the yoke 444 of the overrunning clutch 440. It should be appreciated that the drive system 400 may be integrated into any desired header, for example a corn head, draper head, or pickup head.

Figure 4:
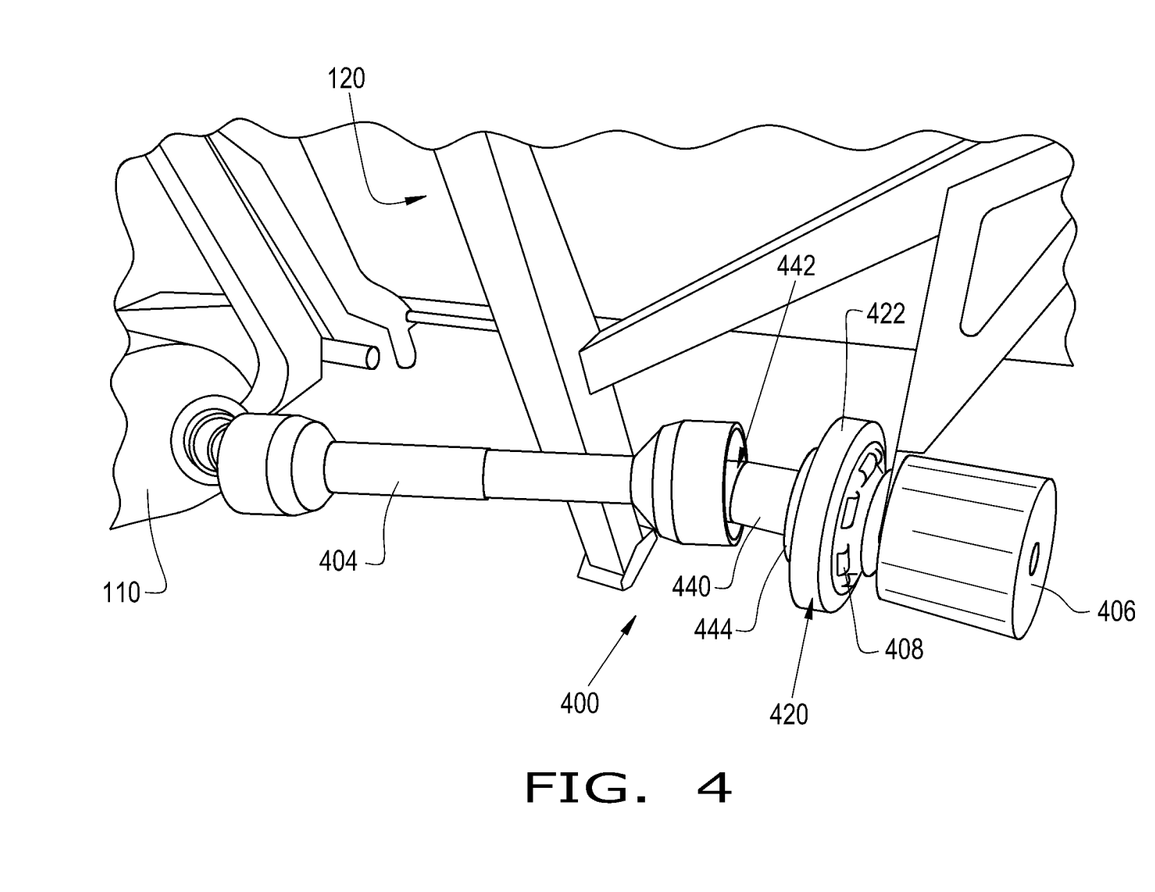
FIG. 4 illustrates a rear perspective view of another exemplary embodiment of a header with a drive system that includes a torque damper and an overrunning clutch, in accordance with an exemplary embodiment of the present invention.
Figure 5:
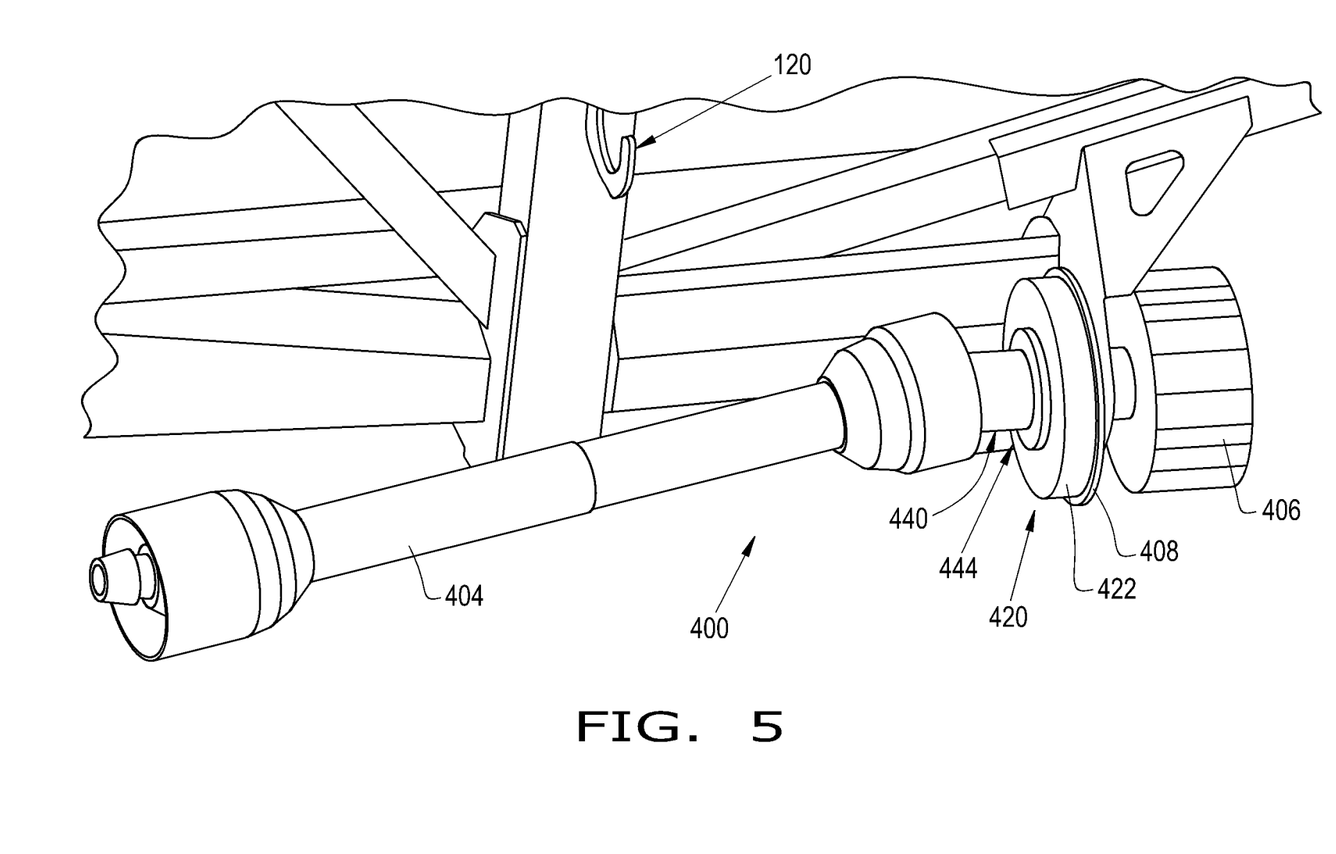
FIG. 5 illustrates a rear perspective view of the drive system of FIG. 4.

The overrunning clutch 440 is connected in between the shaft 404 and the adapter 422. The overrunning clutch 440 is configured for protecting the shaft 404 by disconnecting the shaft 404 from the adapter 422 when the input shaft (not shown) of the gearbox 406 rotates faster than the shaft 404. The overrunning clutch 440 may be in the form of any desired overrunning clutch.

Figure 6:
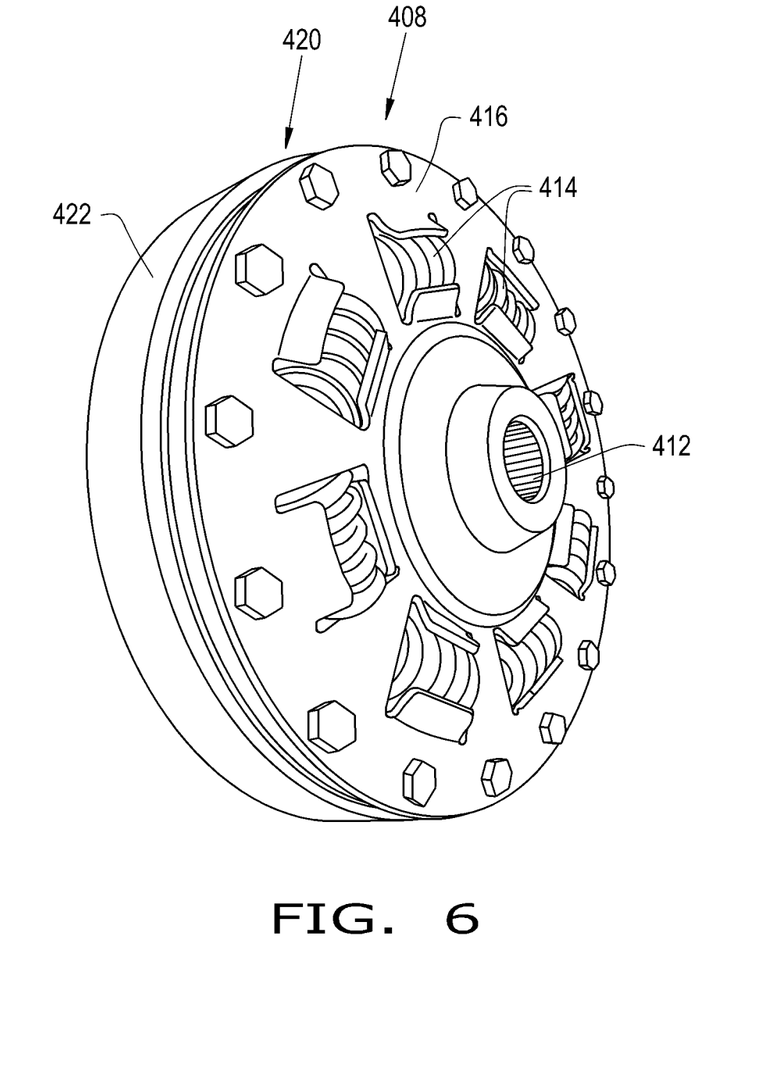
FIG. 6 illustrates a side perspective view of the torque damper of FIGS. 4-5.

The torque damper 408 is coupled in between the gearbox 406 and the adapter 422. The torque damper 408 may include a splined coupler 412, multiple torsional springs 414, and a two-part plate housing 416 for at least partially housing the torsional springs 414 (FIG. 6). The torque damper 408 may directly connect to the input shaft of the gearbox 406 via the coupler 412. The torque damper 408 may be connected to the adapter 422 by one or fasteners. As can be appreciated, the torque damper 408 may also include a housing which entirely covers the torsional springs 414. Alternatively, the torque damper 408 and the coupling assembly 420 may be disposed within a common housing. Also, it should be appreciated that the coupling assembly 420 may or may not include a designated splined sleeve 224, fastener 228, and washer 230, as discussed above. The torque damper 408 may be in the form of any desired torque damper. For example, the torque damper may comprise a spring type torque damper 408, a fluid coupling type damper, and/or a flexible coupling type damper.

In operation, the torque damper 208, 408 may automatically dampen torque spikes during a startup and/or harvesting operation of the header 120. For instance, the operator may connect the header 120 to the agricultural vehicle 100 and initialize the startup operation wherein motive power is initially provided to the choppers 202 of the header 120. During this initial power startup, the choppers 202 may cause a spike in torque, which is subsequently experienced by the shaft 204, 404 and/or feeder drive jack shaft of the feeder housing 110. For instance, the engagement peak torque without a torque damper 208, 408, as measured between the left and right ends of the shaft 204, 404 may be approximately 23000-25000 in-lbs. Such high torque spikes may cause bend, break, or otherwise damage to the shaft 204, 404 and/or the feeder drive jack shaft, which may have an operating torque limit of approximately 17000 in-lbs. Therefore, the torque damper 208, 408 may be vital to dampen the torque spike(s) during startup of the header 120 in order to protect the shaft 204, 404 and/or feeder drive jack shaft. As can be appreciated, during the startup operation, the engine 106 of the agricultural vehicle 100 may idle at 1000-2200 rpm. Also, for example, the torque damper 208, 408 may dampen any torque spikes during the harvesting operation. For instance, a foreign object may contact the choppers 202, causing a spike in torque, and the torque damper 208, 408 may also automatically dampen the magnitude of the torque spike in the harvesting operation.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A drive system of a header for an agricultural vehicle, the header comprising a plurality of driven devices, the drive system comprising:
   a shaft conveying motive power from the agricultural vehicle to the header;
   a gearbox located on the header and for transferring motive power to the plurality of driven devices;
   a torque damper operably connected in between the shaft and the gearbox, and the torque damper reducing a magnitude of a torque spike; and
   a sleeve connected to the gearbox, the gearbox comprises a gearbox shaft, and the sleeve is rigidly mounted onto the gearbox shaft, and the sleeve comprises a first end mounting a bearing and a second end mounting the torque damper such that the adapter and the torque damper are supported by the sleeve.

2. The drive system of claim 1, wherein the torque damper reducing the torque spike in at least one of a startup operation of the header and a harvesting operation of the header.

3. The drive system of claim 1, further comprising a coupling assembly which operably connects the torque damper to the shaft and the gearbox, and the coupling assembly comprising an adapter operably connecting the torque damper to the shaft.

4. The drive system of claim 1, wherein the gearbox shaft comprises a hole, and the coupling assembly further comprises a fastener disposed within the hole and a washer engaging with the fastener and the sleeve such that the fastener and the washer rigidly connect the sleeve to the gearbox shaft.

5. The drive system of claim 4, wherein the sleeve comprises an outer splined surface engaging with the bearing and the torque damper, a first bore with a first diameter, and a second bore with a second diameter which is different than the first diameter, and the first bore housing and engaging with the washer and the second bore receiving and engaging with the gearbox shaft.

6. The drive system of claim 3, further comprising an overrunning clutch connected in between the shaft and the adapter, and the overrunning clutch being configured for protecting the shaft.

7. The drive system of claim 1, wherein the torque damper comprises a housing and a plurality of torsional springs.

8. An agricultural vehicle, comprising:
   a chassis;
   a prime mover supported by the chassis and configured for providing motive power;
   a header connected to the chassis and comprising a plurality of driven devices; and
   a drive system for driving the plurality of driven devices and comprising:
      a shaft connected in between the header and the chassis and conveying motive power from the prime mover to the header;
      a gearbox located on the header and configured for transferring motive power to the plurality of driven devices;
      a torque damper operably connected in between the shaft and the gearbox, and the torque damper is configured for reducing a magnitude of a torque spike; and
      a coupling assembly which operably connects the torque damper to the shaft and the gearbox, and the coupling assembly comprising an adapter operably connecting the torque damper to the shaft, a sleeve connected to the gearbox, and a bearing mounted on the sleeve, wherein the gearbox comprises a gearbox shaft, and the sleeve is rigidly mounted onto the gearbox shaft, and the sleeve comprises a first end mounting the bearing and a second end mounting the torque damper such that the adapter and the torque damper are supported by the sleeve.

9. The agricultural vehicle of claim 8, wherein the torque damper is configured for reducing the torque spike in at least one of a startup operation of the header and a harvesting operation of the header.

10. The agricultural vehicle of claim 8, wherein the gearbox shaft comprises a hole, and the coupling assembly further comprises a fastener disposed within the hole and a washer engaging with the fastener and the sleeve such that the fastener and the washer rigidly connect the sleeve to the gearbox shaft.

11. The agricultural vehicle of claim 10, wherein the sleeve comprises an outer splined surface engaging with the bearing and the torque damper, a first bore with a first diameter, and a second bore with a second diameter which is different than the first diameter, and the first bore housing and engaging with the washer and the second bore receiving and engaging with the gearbox shaft.

12. The agricultural vehicle of claim 8, wherein the drive system further comprises an overrunning clutch connected in between the shaft and the adapter, and the overrunning clutch being configured for protecting the shaft.

13. The agricultural vehicle of claim 8, wherein the torque damper comprises a housing and a plurality of torsional springs.

14. A method for operating a header for an agricultural vehicle, the header comprising a plurality of driven devices, the method comprising:
   providing a drive system for driving the plurality of driven devices, the drive system comprising a shaft configured for conveying motive power from the agricultural vehicle to the header, a gearbox configured for being located on the header and for transferring motive power to the plurality of driven devices, and a torque damper operably connected in between the shaft and the gearbox, a sleeve is connected to the gearbox, the gearbox comprises a gearbox shaft, and the sleeve is rigidly mounted onto the gearbox shaft, and the sleeve comprises a first end mounting a bearing and a second end mounting the torque damper such that the adapter and the torque damper are supported by the sleeve;
   connecting the header to the agricultural vehicle;
   initializing a startup operation of the header and starting the header; and
   dampening a magnitude of a torque spike, by the torque damper, in the startup operation.

15. The method of claim 14, further comprising:
   operating the header in a harvesting operation; and
   dampening the magnitude of the torque spike, by the torque damper, in the harvesting operation.

16. The method of claim 14, wherein the drive system further comprises a coupling assembly which operably connects the torque damper to the shaft and the gearbox, and the coupling assembly comprising an adapter operably connecting the torque damper to the shaft.

17. The method of claim 16, wherein the drive system further comprises an overrunning clutch connected in between the shaft and the adapter, and the overrunning clutch being configured for protecting the shaft.

* * * * *